B. A. LINDERMAN.
DRILL CENTERING TOOL.
APPLICATION FILED APR. 10, 1914.
1,177,344.
Patented Mar. 28, 1916.
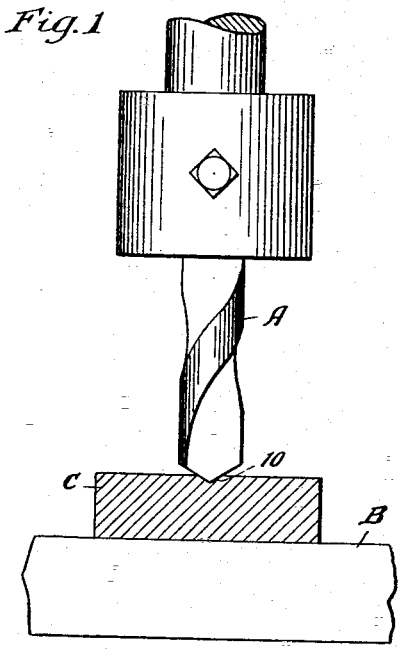
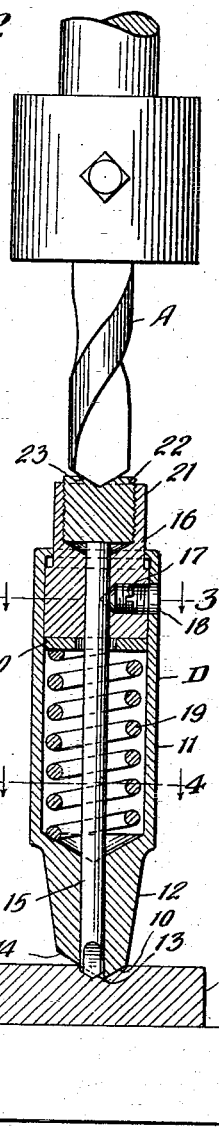
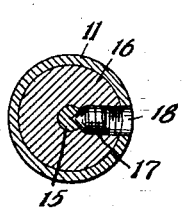
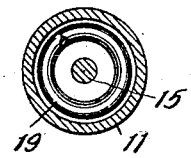
Witnesses:
Wm. Geiger
Joseph Harris
Inventor:
Bert A. Linderman
By Munday, Evarts, Adcock & Clarke his Attys

UNITED STATES PATENT OFFICE.

BERT A. LINDERMAN, OF MUSKEGON, MICHIGAN.

DRILL-CENTERING TOOL.

1,177,344.  Specification of Letters Patent.  Patented Mar. 28, 1916.

Application filed April 10, 1914. Serial No. 830,896.

*To all whom it may concern:*

Be it known that I, BERT A. LINDERMAN, a citizen of the United States, residing in Muskegon, in the county of Muskegon and State of Michigan, have invented a new and useful Improvement in Drill-Centering Tools, of which the following is a specification.

This invention relates to improvements in drill centering tool.

In drilling holes in iron, steel and other metals where great accuracy is required it has been the common practice after the power-drill has been started in the metal to use a small cold chisel and hammer to chip a small groove to one side of the countersink started by the drill in order that the same will aid its way over to the proper point. This has been necessary on account of the fact that it is practically impossible to get a large power-operated drill to start at the exact point desired. This procedure is unsatisfactory, involves too much labor and requires considerable skill such as is not ordinarily possessed by operators of drilling machines.

The object of my invention is to provide a simple hand-tool which may be used by unskilled operators and by which the big power drill may be accurately and rapidly directed to the proper point where the hole is to be drilled.

The invention furthermore consists in the improvements in the parts and devices and in the novel combinations of the parts and devices herein shown, described or claimed.

In the drawing forming a part of this specification, Figure 1 is a side elevation of a portion of a drill and bed plate of a power-operated drill, said figure showing also in section a piece of metal with the drill just started therein. Fig. 2 is a view similar to Fig. 1 but showing the power-operated drill raised up and my improved centering tool inserted between said drill and the metal, the improved tool being shown in vertical section, and Figs. 3 and 4 are detail sectional views taken on the lines 3—3 and 4—4 of Fig. 2.

In said drawing, A denotes a power-operated drill of the usual type, B the bed plate of the drill and C the piece of metal to be drilled.

In using my improved tool, the metal C will be provided with a slight countersink or hole 10 by the drill A, said drill being started in the metal as near the point desired as possible. After the slight countersink has been made, the drill A will be lifted to the position shown in Fig. 2 and my improved tool D brought into use. The hand-tool D comprises an outer casing 11 having a slightly tapered bottom portion 12, the end of which is provided with a point 13 which is off-center, said point 13 being the apex of a conical surface 14, preferably corresponding in angle to the angle of the end faces of the drill A. Slidably mounted in the casing 11 is a small drill 15, the latter having its axis coincident with the axis of the casing 11 so that the point of the drill 15 is offset from the point 13 of the casing a distance equal to the radius of the drill 15. The drill 15 is rigidly secured to a member 16 by means of the set screw 17, access to the latter through the casing 11 being obtained through the hole 18. As will be understood, the member 16 is rotatably mounted within the casing 11 and is held at the upper end thereof by means of a spring 19 between which and the member 16 is interposed a washer 20. The member 16 has an extension 21 at its upper end in which is mounted by threads or otherwise a plug 22 of copper or other relatively soft metal, the plug being provided with a countersink 23 into which the pointed end of the drill A is adapted to be inserted so that the drill will bite into the soft metal plug. The spring 19 keeps the member 16 and consequently the drill 15 within the casing until sufficient pressure is brought on the drill 15 by the drill A to insure the point of the drill 15 being thoroughly embedded in the metal being worked upon.

In using my improved tool, the point 13 thereof will be placed in the countersink started by the drill A and the tool turned to such a position that the point of the drill 15 will be disposed in the direction toward which it is desired to draw the tool A. The tool A is then lowered into contact with the plug 22 and the drill 15 rotated. This provides a recess slightly off center from the countersunk recess 10 in the direction of the proper position of the aperture to be formed by the drill A. This step may be repeated, that is to say, the point 13 of the bottom portion 12 may be positioned in a recess formed by the drill 15 moved over a second step if required. However, in ordinary practice, it is thought that a single operation of the drill 15 will be sufficient as the purpose of the hole made thereby is only to draw the drill A from the low point of the recess 10, the amount of draw being regulated somewhat by the depth of the recess formed by the drill 15. That is to say, if it be only desirable to draw the drill A over a minute distance, only the point of the drill 15 enters the stock and a deeper hole is made if it be desired to draw the tool A farther from its original cutting position.

The centering of the tool A from an off-center position is accomplished by weakening one side of the recess provided in first boring. The tool itself tends to move toward this weakened side and changes its center thereby in degree proportional to the weakening to the amount of material removed by the drill 15. If a slight scratch is made by the tool little movement from its earlier center will occur when the tool A is returned to boring position whereas if a deep hole be cut by the tool 15 the tool A will move over quite an appreciable distance. The cutting of any intermediate amounts by the drill 15 will produce corresponding movements from its original cutting position of the tool A when returned to drilling position.

From the preceding description, the simplicity and utility of my improved tool will be apparent to those skilled in the art. The tool may be carried by the machinist with his kit of tools, the centering tool is small and light, it may be manufactured at relatively small cost, and various parts thereof such as the drill 15 and the relatively soft metal plug 22 may be renewed at slight expense.

Although I have herein shown and described what I now consider the preferred embodiment of my improvements, yet it will be understood that various changes and modifications may be made without departing from the spirit of the invention, and all such changes and modifications are contemplated as come within the scope of the claims appended hereto.

I claim:

1. A tool of the character described for centering drills comprising, in combination: a casing having a pointed end adapted to be received in a countersink in the metal being drilled; a relatively small drill rigidly mounted in and carried by said casing, the point of said small drill being off-center relatively to said casing point; and means whereby said small drill may be rotated, substantially as specified.

2. A tool of the character described for centering drills comprising, in combination: a casing having a pointed end adapted to be received in a countersink in the metal being operated upon; a relatively small drill rotatably and slidably mounted in and carried by said casing, the point of said small drill being off-center relative to said casing point a distance equal substantially to the radius of the small drill; and means whereby said drill may be rotated, substantially as specified.

3. A hand tool comprising a rotatably mounted drill and a holder for the same, said holder having a point for engagement in the center of a countersink and located off the center of rotation of said drill, substantially as specified.

4. A hand tool comprising a rotatably mounted drill, and means for positioning said drill with its axis of rotation to one side of the center of a countersink, said means engaging within the countersink when in operative position, substantially as specified.

5. A hand tool comprising a rotatably mounted drill; means for positioning said drill to one side of the center of a countersink in the metal being operated upon; and means for rotating said drill from a larger power-operated drill when the tool and power-operated drill are placed in coöperative relation, substantially as specified.

6. A hand tool comprising a rotatably mounted drill; means for positioning said drill to one side of the center of a countersink in the metal being operated upon; and means for rotating said drill from a larger power-operated drill when the tool and power-operated drill are placed in coöperative relation, said means including a relatively soft piece of metal fixedly associated with the hand-tool drill to rotate therewith, said metal piece being located at the top end of the hand-tool and adapted to have the point of the power-operated drill bite thereinto to thereby rotate the hand-tool drill, substantially as specified.

7. A tool of the character described comprising, in combination: a casing; a drill rotatably mounted in said casing; means for rotating said drill from a power-operated drill; and means for positioning said tool drill off-center relative to a counter sink in the metal being operated upon and while said drill is being rotated by the power drill, substantially as specified.

8. A tool of the character described comprising, a casing having a point at its lower end adapted to be seated in a countersink in the metal being operated upon; and an element carried by said casing adapted to displace portions of the metal to be drilled, said element being slidably mounted in the casing and having its axis offset from the point of the casing, substantially as specified.

9. A drill centering tool comprising, a casing having a point at one end thereof; a drill slidably and rotatably mounted in said casing; a member rotatably mounted in said casing and to which the drill is fixed, said member carrying a relatively soft metal plug at its upper end; and a spring within the casing normally holding the point of said drill within the casing, substantially as specified.

Signed this 23rd day of March, 1914, in the presence of two witnesses.

BERT A. LINDERMAN.

Witnesses:
 JOSEPH HARRIS,
 H. M. MUNDAY.

Copies of this patent may be obtained for five cents each, by addressing the "Commissioner of Patents, Washington, D. C."